United States Patent
Kaldani et al.

(10) Patent No.: US 6,741,591 B1
(45) Date of Patent: May 25, 2004

(54) SEARCH ENGINE INTERFACE SYSTEM AND METHOD

(75) Inventors: George Kaldani, Los Gatos, CA (US); Kamran Izadi, Campbell, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/433,658

(22) Filed: Nov. 3, 1999

(51) Int. Cl.[7] .......................... H04L 12/28; H04L 12/56
(52) U.S. Cl. .................. 370/389; 370/395.3; 370/473; 370/474; 709/243
(58) Field of Search .................. 370/389, 412, 370/351, 392, 395.3, 438, 439, 489, 490, 474, 473; 382/180; 709/243, 238

(56) References Cited

U.S. PATENT DOCUMENTS

| | | | |
|---|---|---|---|
| 5,265,207 A | * 11/1993 | Zak et al. .................. 712/15 |
| 5,530,809 A | * 6/1996 | Douglas et al. ............ 709/250 |
| 5,590,283 A | * 12/1996 | Hillis et al. ................ 712/29 |
| 5,938,736 A | * 8/1999 | Muller et al. ............... 709/243 |
| 5,999,664 A | * 12/1999 | Mahoney et al. ........... 382/305 |
| 6,014,659 A | * 1/2000 | Wilkinson et al. ............ 707/3 |
| 6,128,666 A | * 10/2000 | Muller et al. ............... 709/238 |
| 6,246,680 B1 | * 6/2001 | Muller et al. ............... 370/389 |
| 6,259,699 B1 | * 7/2001 | Opalka et al. .............. 370/398 |
| 6,424,658 B1 | * 7/2002 | Mathur ....................... 370/429 |

* cited by examiner

*Primary Examiner*—Wellington Chin
*Assistant Examiner*—Jamal A. Fox
(74) *Attorney, Agent, or Firm*—Campbell Stephenson Ascolese LLP (57) ABSTRACT

A search engine interface system comprising a header analyzer, which is coupled to a search engine interface adaptor that receives from header parser via a search engine interface bus output data signals comprising, such as, for example, a 32-bit data word 13, Data_Out [31 . . . 0], together with a data valid flag signal 15 (Dvalid_Out), and a command valid flag signal 17 (Cvalid_Out). In response to receiving a search command identified via the search engine interface bus, search engine interface adaptor also generates an output memory store search request provided to a memory storage, such as a ternary CAM, or alternatively to a SRAM, for pattern matching. Results of search from a memory storage CAM or SRAM are then provided back to search engine adaptor, which then conveys the search response via search response signals, such as via search engine interface bus data word Data_In[31 . . . 0] and valid response flag signal, Valid_In, back to header analyzer.

17 Claims, 7 Drawing Sheets

Search Engine Interface

FIG. 1

| Signal | Direction | Function |
|---|---|---|
| Data_Out[31:0] | Output | Output data bus. This bus carries command information qualified by Cvalid_Out and data information qualified by Dvalid_Out. During the data phase, this bus either carries the comparand during search operations, address during read operations, and data during write operations. |
| Cvalid_Out | Output | This control signal qualifies when command information is valid on the Data_Out bus. |
| Dvalid_Out | Output | This control signal qualifies when data information is valid on the Data_Out bus. |
| Data_In[31:0] | Input | Input data bus. This bus carries command and data information when Valid_In is high. The command bits specify whether the data is write response, read data, or search results. |
| Valid_In | Input | This control signal qualifies the Data_In bus. |

*FIG. 2*

Search Requests:

| Cmd | Ing/Egr | Port Number | Packet ID | Search Phase | Search Key Length | PET Index | Int. TCAM Match | TCAM Match Address |
|---|---|---|---|---|---|---|---|---|
| 31 30 | 29 | 28 23 | 22 19 | 22 20 | 16 12 | 11 7 | 6 | 5 1 |

Search Key

FIG. 3

Search Responses:

| Cmd | Ing/Egr | Packet ID | Search Phase | Result Code | Result Data |
|---|---|---|---|---|---|
| 31 30 | 29 | 28 25 | 24 22 | 21 19 | 18 0 |

Result Data

FIG. 4

FIG. 5
Read Command Timing

FIG. 6

Write Command Timing

FIG. 7

Search Command Timing with Search Length = 1

FIG. 8

SEARCH ENGINE INTERFACE SYSTEM AND METHOD

FIELD OF INVENTION

Invention relates to search engine interfaces, particularly search engine interfaces in network data processors.

BACKGROUND OF INVENTION

Traditionally, the search function in network packet processors has been an integral part of the packet processing, either implemented via software or via direct access of pattern matching lookup tables stored on a RAM, or a content addressable memory (CAM). There is no conventional interface between a header data processing and the critical search function processing comprising header data lookup and processing in ATM or Internet Protocol (IP), or in other network protocols such as an ethernet, and custom protocols.

With increasing ternary CAMs and fast SRAMs developed with its own associated proprietary CAM or SRAM interface, as well as unique search algorithms being increasingly performed by dedicated processing elements, the search function is correspondingly a non-integral part of packet processing. There is therefore a need for a flexible search engine interface and a protocol that functions as an adaptor, or a communication vehicle between the internet data processor and a search engine.

SUMMARY OF THE INVENTION

A search engine interface system is provided comprising a header analyzer, which receives incoming network data stream, such as from the internet or ATM network, and parses up that incoming data packet (or ATM cell, if ATM application) to identify the header information. Header parser is then coupled to a search engine interface adaptor that receives from header parser via a search engine interface bus output data signals comprising, such as, for example, a 32-bit data word 13, Data_Out [31 . . . 0], together with a data valid flag signal 15 (Dvalid_Out ), and a command valid flag signal 17 (Cvalid_Out). In response to receiving a search command identified via the search engine interface bus, search engine interface adaptor also generates an output memory store search request provided to a memory storage, such as a ternary CAM, or alternatively to a SRAM, for pattern matching. Results of search from a memory storage CAM or SRAM are then provided back to search engine adaptor, which then conveys the search response via search response signals, such as via search engine interface bus data word Data_In[31 . . . 0] and valid response flag signal, Valid_In, back to header analyzer.

DETAILED DESCRIPTION OF PREFERRED EMBODIMENT(S)

Figure 1:
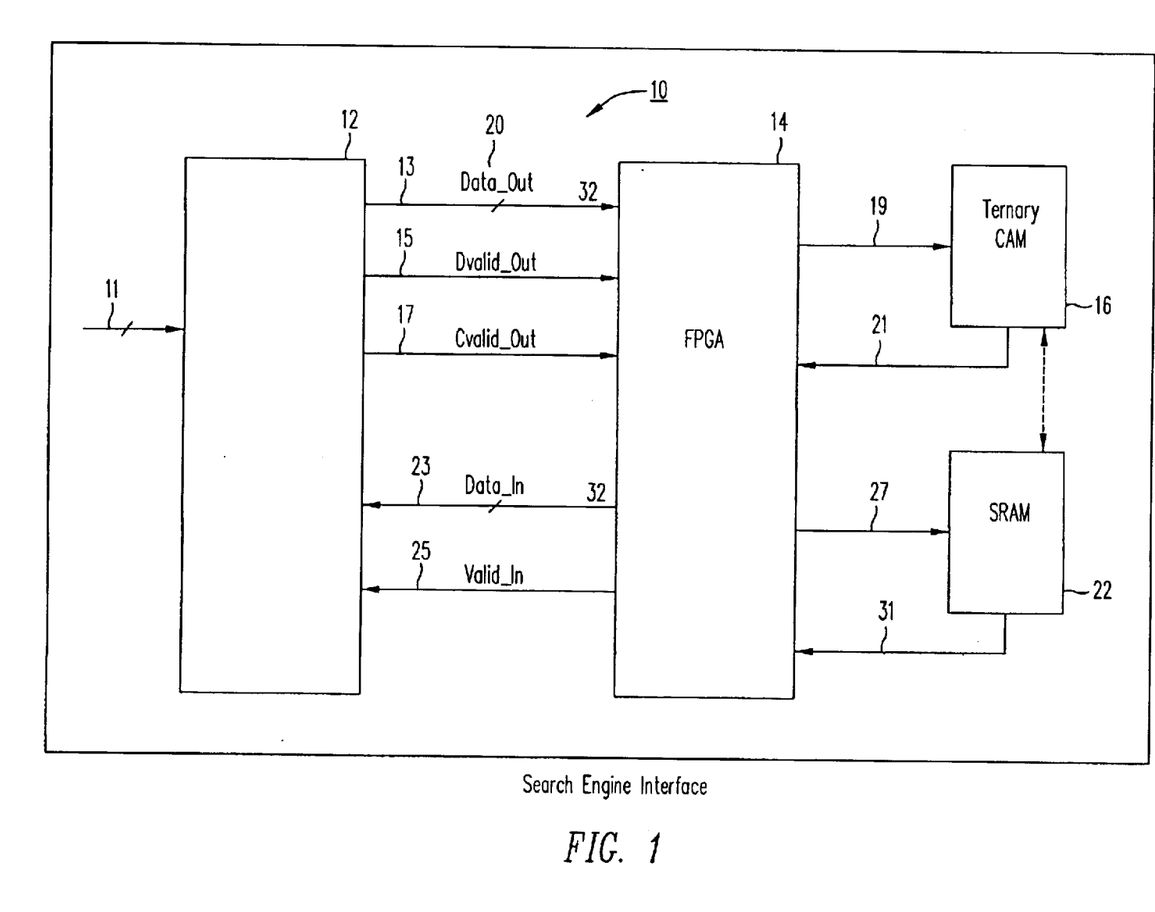
FIG. 1 illustrates a general block diagram of a search engine interface system in accordance with the principles of this invention.

FIG. 1 illustrates a search engine interface system 10 provided in accordance with the principles of this invention. Search engine interface system 10 comprises a header analyzer 12, which receives incoming network data stream 11 such as from the internet or ATM network, and parses up that incoming data packet (or ATM cell, if ATM application) 11 to identify the header information. Header parser 12 is coupled to a search engine interface adaptor 14 that receives from header parser 12 a set of search engine interface bus 20 (as further detailed in FIG. 2) comprising output data signals, such as, for example, a 32-bit data word 13, Data_Out [31 . . . 0], together with a dita valid flag signal 15 (Dvalid_Out), and a command valid flag signal 17 (Cvalid_Out). In response to receiving a search command identified via input signals Data_Out [31 . . . 0)] 13, search engine interface adaptor 14 also generates an output memory store search request 19 provided to memory storage 16, such as a ternary CAM, or alternatively an output memory store search request 27 provided to memory storage 22, such as an SRAM 22, for pattern matching. Results of search from memory storage CAM 16 or SRAM 22 are then provided back to search engine adaptor 14 (e.g., via paths 21 and 31 respectively), which then conveys the search response via search response signals, such as data word 23 (i.e., Data_IN [31 . . . 0] and valid response flag signal 25, Valid_In, back to header analyzer 12.

Figure 2:
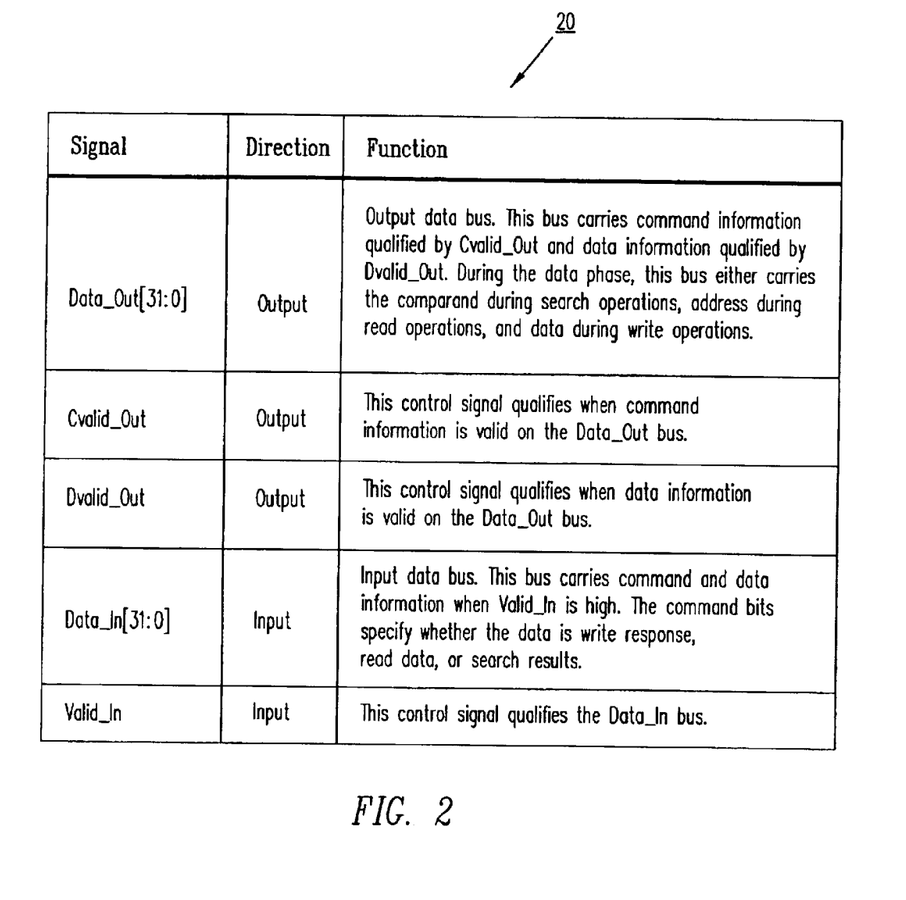
FIG. 2 is a table illustrating the various search engine interface signals of FIG. 1 and their associated functions.
Figure 3:
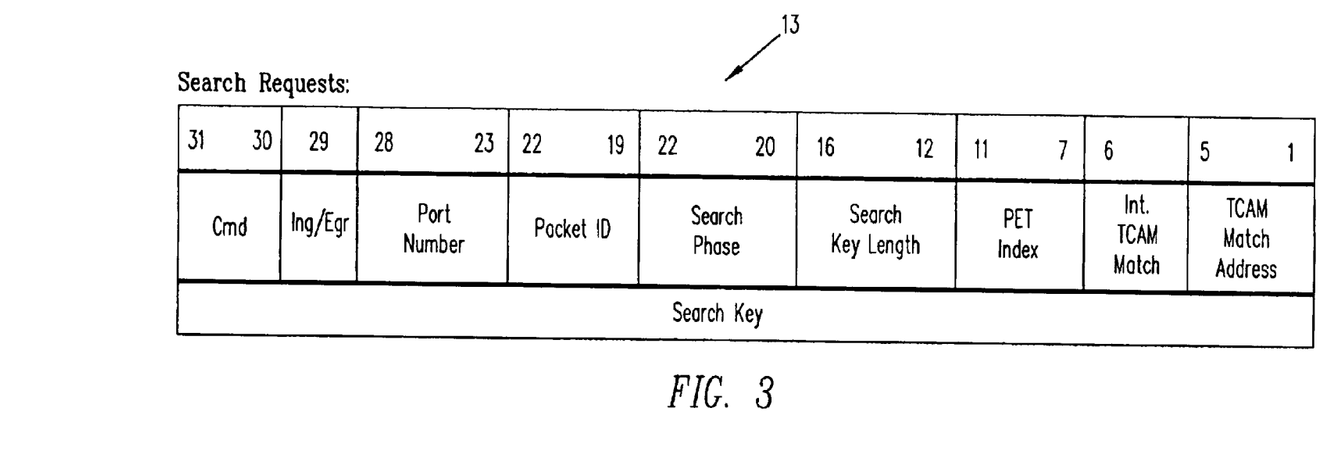
FIG. 3 illustrates a sample search request format of the search engine interface signals of FIG. 2.
Figure 4:
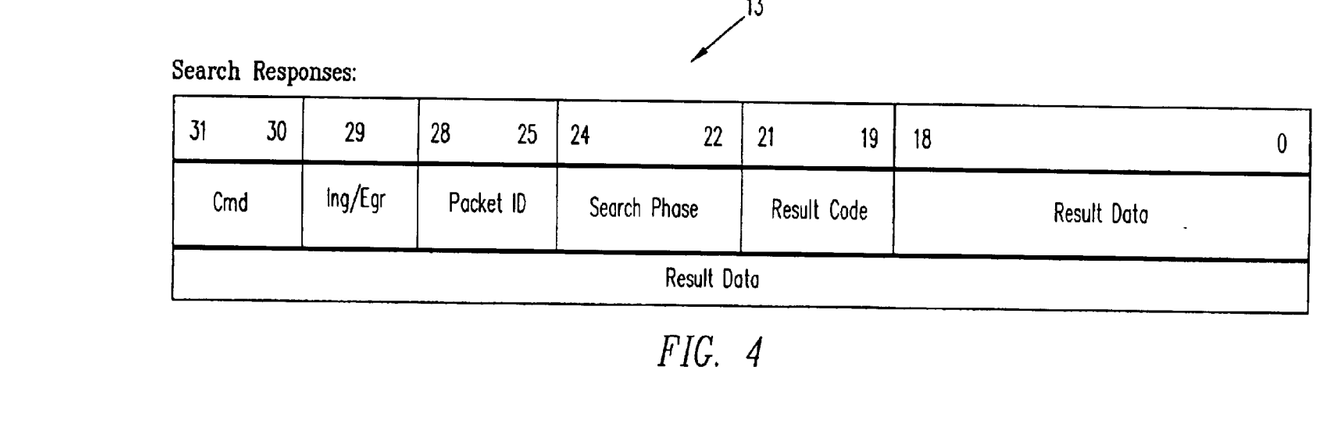
FIG. 4 illustrates a sample search response format of the search engine interface signals of FIG. 2.

FIG. 2 is a table illustrating in more detail the function and operation of various search engine interface bus signals 20. FIGS. 3 and 4 each illustrates the format and fields of data input signal 13 to support a search request operation and a search response operation, respectively.

There are four basic commands provided by search engine interface system 10. The four command are Search, Read, Write, and Idle. Read and Write command generate access to the external SRAM, CAM data array, CAM mask array, CAM internal registers, or FPGA internal registers based on the address mapping. Table 1 list the command field parameters on ingress and egress of Data_Out signal 13. Table 1 parameters also apply similarly to Data_IN[31 . . . 0] signal 23 if Valid_In flag 25 is activated. Each command cycle is followed by one or more data cycles on Data_Out and Data_IN buses (see examples in FIGS. 5–8). Duplicated below from FIG. 3, Table 1 illustrates a sample search request format of search engine interface signal 13. As shown in Table 1 below, data signal 13 comprises following fields:

TABLE 1

Data Fields For Search Request Operation Associated With Search Engine Interface Bus

| 31 30 | 29 | 28 24 | 23 20 | 19 17 | 16 11 | 10 6 | 5 | 4 0 |
|---|---|---|---|---|---|---|---|---|
| Cmd | Ing/Egr | Port Number | Packet ID | Search Phase | Search Key Length | PET Index | Int. TCAM Match | TCAM Match Address |
| Search Key ||||||||||

Wherein search engine interface bus comprises the following fields:

Cmd : 00=Idle, 01=Read, 10=Write, 11=Search

Ing/Egr: 1=Ingress Data (Phy), 0=Egress Data (Fabric)

Port Number: Indicates which of the channels 0–17 is the source of the packet/cell.

Packet ID: Unique Packet ID number.

Search Phase: Since up to 5 maximum searches are possible, this 3-bit field assigns a unique phase to each search.

Search Key Length: The length of the search in nibbles. Minimum is a 1 nibble (4-bit) search key and maximum is a 32 nibble (128-bit) search key. For ATM cells, the search key is 28- bits with length value=6'b011100. A 32 nibble(128-bit) search key is represented by the Search Key Length=6'b100000.

PET Index: The Pattern Extraction Table that generates the search key.

Internal TCAM Match: This field is only valid if it is the first search phase. This bit indicates if there is a match in the internal TCAM.

TCAM MatchAddress: This field is only valid if it is the first search phase and indicates the internal TCAM match address if there is a match.

Figure 7:
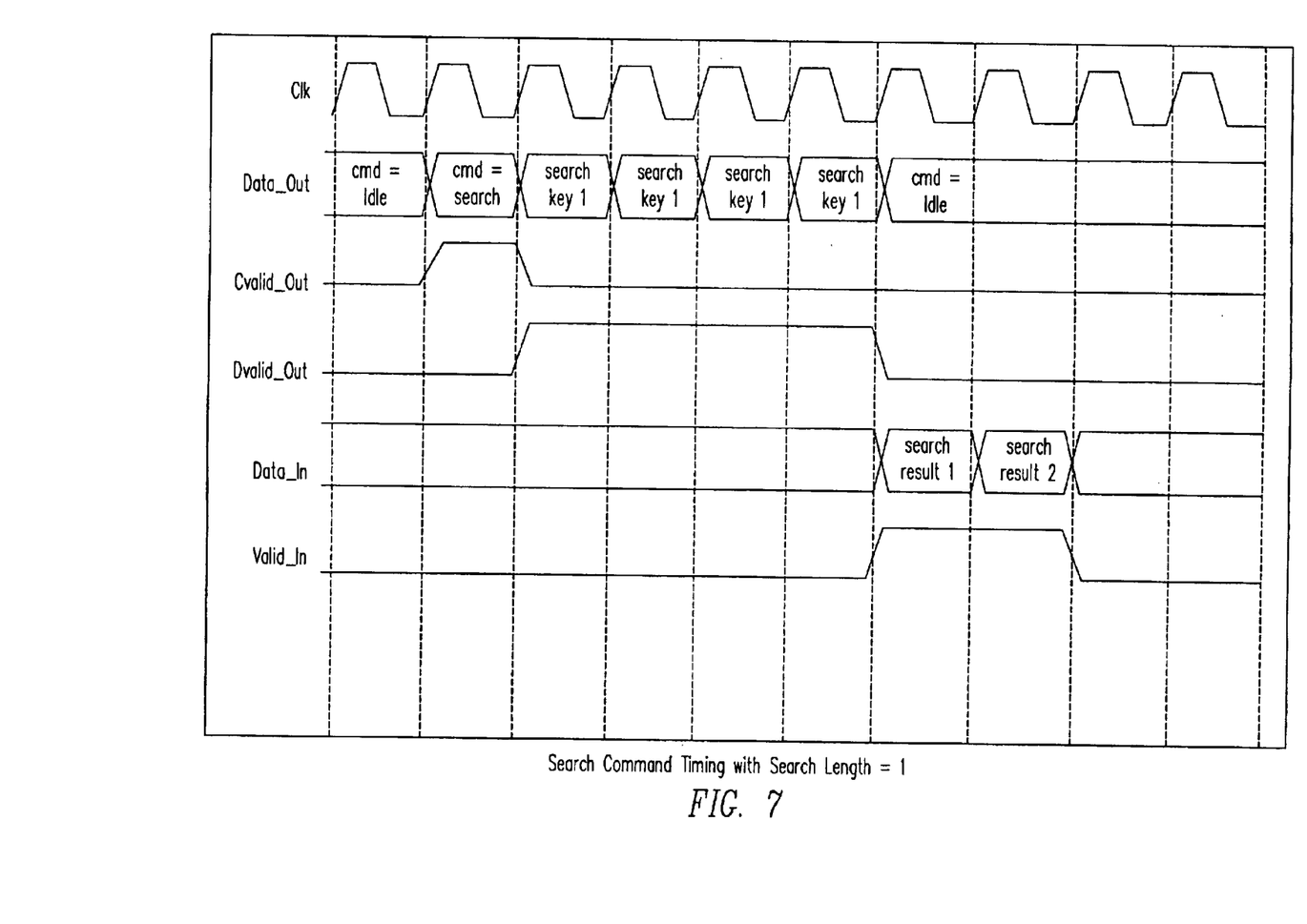
FIG. 7 illustrates a relative timing relationship of search engine interface bus signals for a search operation, with search length=1.
Figure 8:
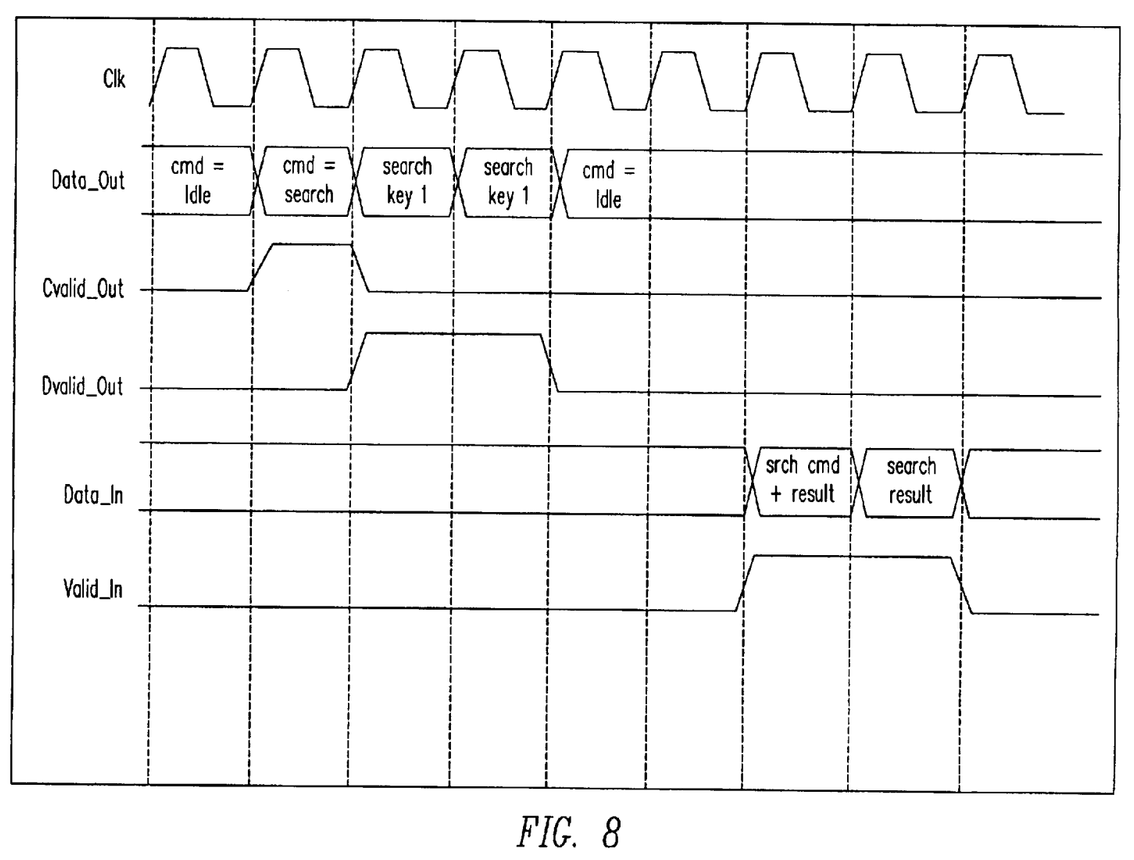
FIG. 8 illustrates a relative timing relationship of search engine interface bus signals for a search operation having variable search length value.

The Search command performs a search of the data array for a desired pattern. The pattern length can be variable depending on the programmed mask register which specifies the number of bits that will be masked from the pattern search. The search length range varies from 4-bytes to 64-bytes depending on the value of the search length field. (FIG. 7 illustrates search command timing with Search Length=1, while FIG. 8 show the timing for search operations with different values for the search length field.)

Duplicated below from FIG. 4, Table 2 illustrates a sample search response return format of search engine interface signal 13 or 23, i.e., Data_Out[31 . . . 0] or Data_In[31 . . . 0]. As shown in Table 2 below, search engine interface bus signals 13 or 23 comprises the following fields for a search response return operation.

TABLE 2

Data Fields For Search Request Operation Associated With Search Engine Interface Bus

| 31 30 | 29 | 28 25 | 24 22 | 21 19 | 18 0 |
|---|---|---|---|---|---|
| Cmd | Ing/Egr | Packet ID | Search Phase | Result Code | Result Data |
| Result Data ||||||

As illustrated, in a search response operation, search engine interface bus comprises the following fields:

Cmd: 00=Idle, 01=Read Response, 10=Write Response, 11=Search Response.

Ing/Egr: 1=Ingress, 0=Egress.

Packet ID: Unique Packet ID number.

Search Phase: Indicate search phase to support up to a maximum of 5 searches.

Result Code: 001=Match, 010=Not Match, 011=Discard, 100=External, 101=Terminate. The Result Data fields differ based on the result code and are summarized in Table 1–4 through 1–7. There is no data associated with Discard or Not Match result codes.

Table 3 illustrates a search response operation wherein the search result code returns a value of 001 corresponding to a match found in response to a previously sent search request.

TABLE 3

Data_In Search Response Operation With Search Result Code = 001 (Match)

| 31  30 | 29 | 28  25 | 24  22 | 21  19 | 18 | 17  0 |
|---|---|---|---|---|---|---|
| Cmd | Ing/Egr | Packet ID | Search Phase | Result Code = 100 | CS | Search Result 1 |
| Search Result 2 (bits 31 to 16) | | | | | | | wherein CS: Configuration State comprises values: 1=the last search for that packet/cell, 0=more searches required for that packet/cell.

Table 4 illustrates the search engine bus signals wherein search result code=100, indicating an external memory search needed.

TABLE 4

Data_In With Search Result Code = 100

| 31  30 | 29 | 28  25 | 24  22 | 21  19 | 18  14 | 13  0 |
|---|---|---|---|---|---|---|
| Cmd | Ing/Egr | Packet ID | Search Phase | Result Code = 100 | PET Index | Reserved |

Table 5 illustrates the search engine bus signals wherein search result code=101, indicating to terminate further searches.

TABLE 5

Data_In With Search Result Code = 101

| 31  30 | 29 | 28  25 | 24  22 | 21  19 | 18 | 17  0 |
|---|---|---|---|---|---|---|
| Cmd | Ing/Egr | Packet ID | Search Phase | Result Code = 101 | QID2 Valid | Entry FID |
| Exit FID (bits 17 to 0) | | | | | | |
| QID1 (bits 31 to 16) | | | | QID2 (bits 15 to 0) | | |

Table 6 illustrates the search engine bus signals for a read operation:

TABLE 6

Data_Out Command/Data Fields During Read

| 31  30 | 29  0 |
|---|---|
| Cmd | Read Address |

Table 7 illustrates the search engine bus signals for a write operation:

TABLE 7

Data_Out Command/Data Fields During Write

| 31  30 | 29  0 |
|---|---|
| Cmd | Write Address |
| Write Data | |

Table 8 illustrates the search engine bus signals during a read response return operation:

TABLE 8

Data_Out Command/Data Fields During Read Response Operation

| 31 30 | 29                          0 |
|-------|-------------------------------|
| Cmd   | TBD                           |
| Read Data |                           |

Figure 5:
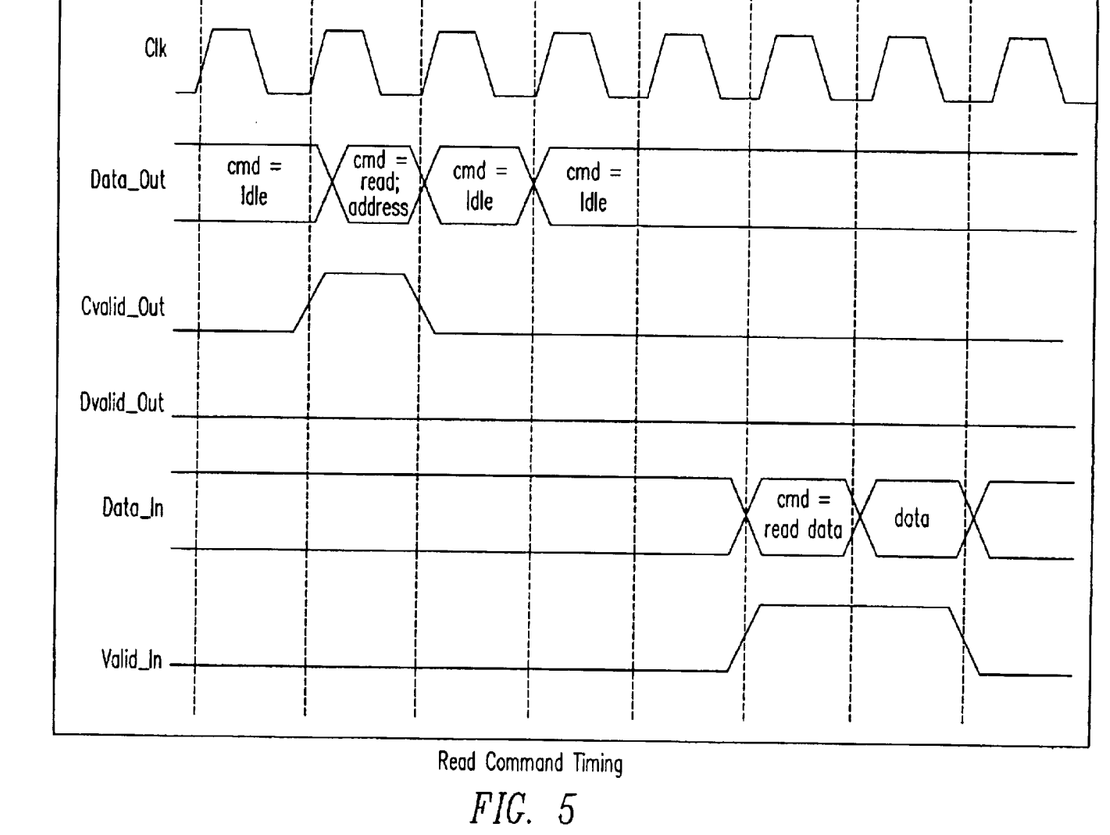
FIG. 5 illustrates a relative timing relationship of search engine interface bus signals for a read operation.

Read Operation can be either single data or block of data from the SRAM, CAM Array, CAM registers, or FPGA internal registers. FIG. 5 shows the timing for the Read command.

Table 9 illustrates the search engine bus signals during a write response return operation:

TABLE 9

Data_Out Command/Data Fields During Write Response Operation

| 31 30 | 29                          0 |
|-------|-------------------------------|
| Cmd   | Write Response Tag            |

Figure 6:
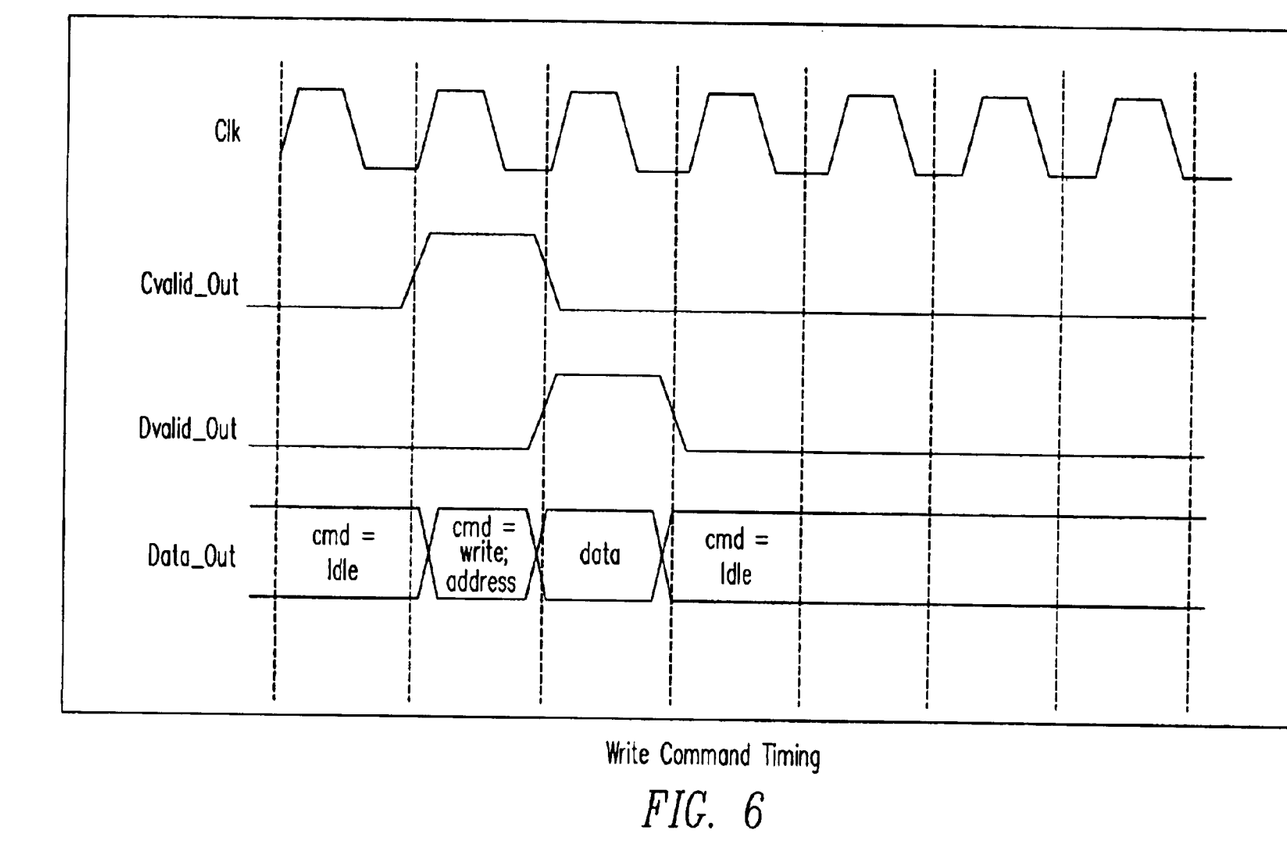
FIG. 6 illustrates a relative timing relationship of search engine interface bus signals for a write operation.

Write operations can be write of single SRAM, data array, mask array, or internal registers or it can be a block write operation where a starting address is provided followed by a block of data words. FIG. 6 illustrates the timing for the single write command.

FIGS. 7 and 8 illustrate sample relative timing setups for search engine interface bus signals to implement read, write, search with search length=1 (FIG. 7), and with variable search length operations (FIG. 8). The latency of the read data with respect to read address is variable; all requests must be completed in FIFO order.

There is a limit on the number of reads/writes that the microprocessor can issue in order to adequately manage the flow control between the search engine and the CAM interface. The CAM interface can handle bursts of up to 8 write operations equivalent to bursts of 16 CPU reads. The management is implemented using a depth register that keeps track of the allowable number of reads/writes the cpu can issue to the search engine.

In the preferred embodiment a DEPTH_REGISTER is provided that will indicate the number of read/writes pending in the CAM interface read/write FIFO and will increment each time the cpu issues a read or write. The increment value is 2 for cpu writes since it occupies 2 slots in the FIFO. The increment value is 1 for cpu reads since it occupies only 1 slot in the FIFO. This register will decrement when read/write response comes back from the search engine. The decrement value is 2 for write responses and 1 for read responses. The maximum value of this register is 16. The CAM interface will arbitrate between the header parsing and microprocessor blocks for sending search requests or read/write requests.

Foregoing described embodiments of the invention are provided as illustrations and descriptions. They are not intended to limit the invention to precise form described. In particular, Applicant contemplates that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

What is claimed is:

1. A search engine interface adaptor operable to be coupled between a header parser and a memory, the search engine interface adaptor comprising:
   an input data port operable to receive an input data word;
   an input valid flag port; wherein the input valid flag port is operable to receive flag information indicating a type of input data word being transmitted to the input data port;
   an output data port operable to transmit an output data word to the header parser;
   an output valid flag port operable to transmit flag information indicating transmission of valid data from the output data port;
   a memory interface configured to be coupled to the memory; and
   a processor configured to process the input data word; wherein the processor is further configured to perform a multiple phase search depending on an indication in the input data word.

2. The search engine interface adaptor of claim 1 wherein the flag information indicating a type of input data word being transmitted to the input data port further comprises at least one of an input data valid flag signal and an input command valid flag signal.

3. The search engine interface adaptor of claim 1 wherein the indication in the input data word comprises a search phase value in a search phase field.

4. The search engine interface adaptor of claim 1 wherein the input data word includes at least one of a read command, a write command, a search command, and an idle command.

5. The search engine interface adaptor of claim 1 wherein the input data word includes a pattern table index value, and wherein the pattern table index value is associated with a search key.

6. The search engine interface adaptor of claim 1 wherein the input data word includes a variable length search key operable to be processed by the processor.

7. A method comprising:

receiving an input data word related to a search related operation, the input data word including information about a phase of the search related operation;

receiving an input valid flag, wherein a value of the input valid flag is indicative of a type of input data word;

processing the input data word depending on the value of the input valid flag; and accessing a memory according to the processing of the input data word.

8. The method of claim 7 wherein the input data word further comprises at least one of a read command, a write command, a search command, and an idle command.

9. The method of claim 7 wherein input valid flag further comprises at least one of an input data valid flag and an input command valid flag.

10. The method of claim 7 further comprising:

receiving a search result from the memory; and transmitting the search result to a header parser.

11. The method of claim 10 further comprising:

transmitting an output valid flag substantially simultaneously with the transmitting the search result to a header parser.

12. The method of claim 7 wherein the input data word further comprises an index value and wherein the processing further comprises: determining a search key based on the index value.

13. The method of claim 7 wherein information about a phase of the search related operation comprises a search phase value in a search phase field.

14. An apparatus comprising:

a means for receiving an input data word, the input data word including information about a phase of the search related operation;

a means for receiving an input valid flag, wherein a value of the input valid flag indicates a type of input data word;

a means for accessing a memory according to the input data word.

15. The apparatus of claim 14 further comprising:

a means for processing the input data word to determine at least one of: a command type, a search key, and the phase of the search related operation.

16. The apparatus of claim 14 further comprising:

a means for receiving a search result from the memory.

17. The apparatus of claim 14 further comprising:

a means for transmitting a search result to a means for parsing.

* * * * *